United States Patent [19]

Wright et al.

[11] 4,292,138

[45] Sep. 29, 1981

[54] ENERGY BALANCE CONTROL FOR FRACTIONATION TOWER

[75] Inventors: Robert M. Wright, Dickinson; Allan W. Johncock, Texas City, both of Tex.

[73] Assignee: Standard Oil Company (Indiana), Chicago, Ill.

[21] Appl. No.: 752,517

[22] Filed: Dec. 20, 1976

Related U.S. Application Data

[63] Continuation-in-part of Ser. No. 614,205, Sep. 17, 1975, abandoned.

[51] Int. Cl.$^3$ .............................................. B01D 3/42
[52] U.S. Cl. ........................................ 203/2; 202/160
[58] Field of Search ....................... 196/132; 202/160; 203/DIG. 18, 1, 2

[56] References Cited

U.S. PATENT DOCUMENTS

| | | | |
|---|---|---|---|
| 3,156,628 | 11/1964 | Larrison | 196/132 |
| 3,224,947 | 12/1965 | Lupfer | 203/DIG. 18 |
| 3,227,631 | 1/1966 | Stine | 203/DIG. 18 |
| 3,361,646 | 1/1968 | MacMullan | 203/1 |
| 3,411,308 | 11/1968 | Bellinger | 62/21 |
| 3,415,720 | 12/1968 | Rijnsdorp et al. | 202/181 |
| 3,428,528 | 2/1969 | Oglesby, Jr. et al. | 203/1 |
| 3,449,215 | 6/1969 | Johnson et al. | 203/3 |
| 3,498,704 | 12/1970 | Follain et al. | 202/160 |
| 3,840,437 | 10/1974 | Awan | 203/2 |
| 3,905,873 | 9/1975 | Wright | 202/160 |
| 4,007,112 | 2/1977 | Benker et al. | 196/132 |

*Primary Examiner*—Hiram Bernstein
*Attorney, Agent, or Firm*—Lansing M. Hinrichs; William T. McClain; William H. Magidson

[57] ABSTRACT

This invention relates to an improved apparatus and process for controlling heat input to a fractionation tower so that a proper energy balance is maintained. The apparatus and method for controlling a fractionation tower and process wherein feed and heat flow into the tower and feed is distilled and separated into distillate and bottoms, said distillate flowing from the tower through an overhead line into a condenser where it is allowed to condense before it is drawn off as product with a portion of this product being returned to the tower as reflux, and said bottoms being allowed to at least partially collect in the tower thereby establishing a liquid level which is allowed to fluctuate within predetermined limits, which method comprises generating and using the signal:

$$Q_I = K_p(K_R + K_D - K_F)$$

where
  $Q_I$ is the heat required by the fractionation tower;
  $K_p$ is the pressure controller output signal;
  $K_R$ is the reflux flow rate signal;
  $K_D$ is the distillate flow rate signal;
  $K_F$ is a scaled feed flow rate signal;

to control energy balance in the fractionation tower and process.

5 Claims, 1 Drawing Figure

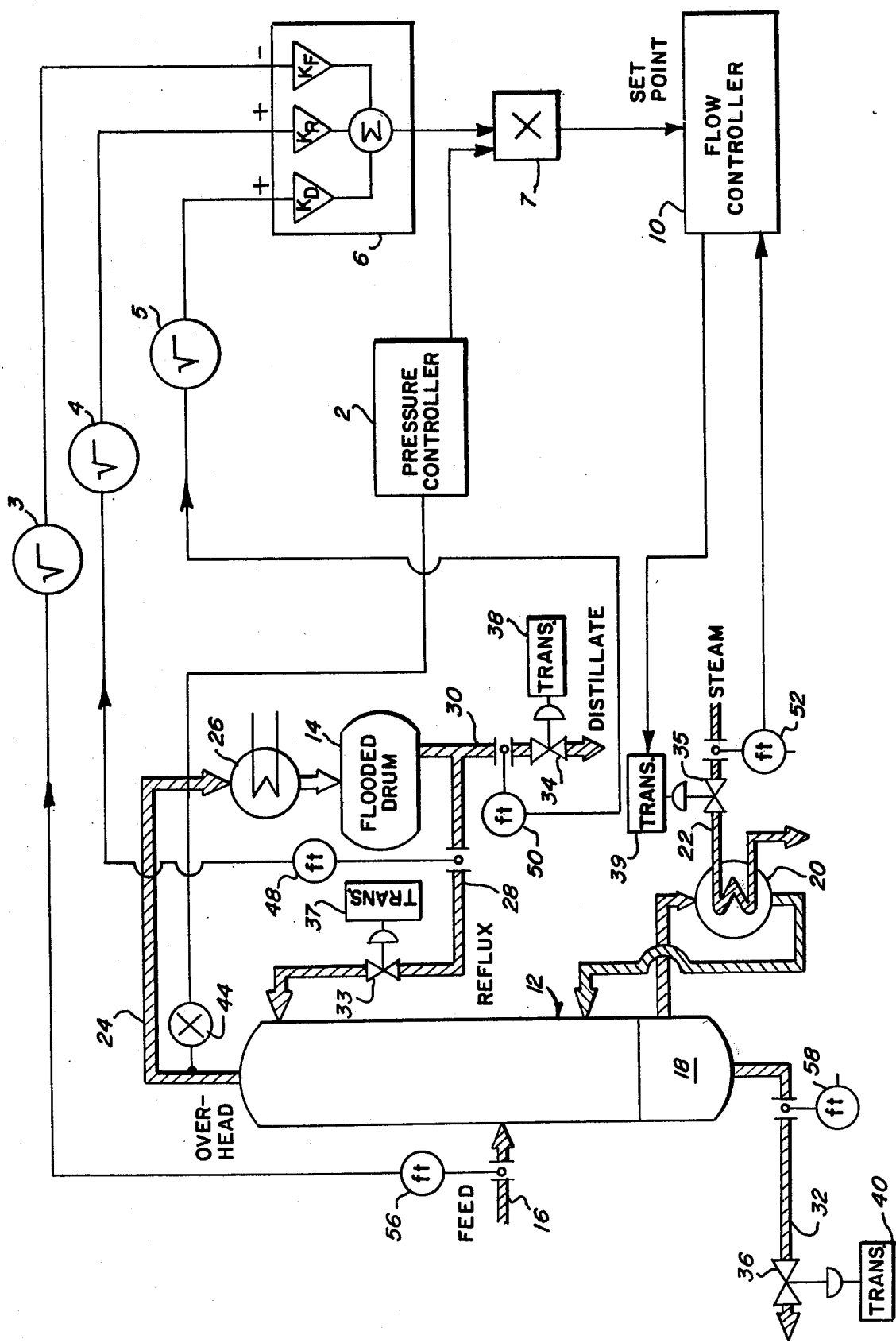

ENERGY BALANCE CONTROL FOR FRACTIONATION TOWER

CROSS-REFERENCE TO RELATED APPLICATIONS

This application is a continuation-in-part of patent application Ser. No. 614,205, filed Sept. 17, 1975, now abandoned.

BACKGROUND OF THE INVENTION

A fractionation tower is an efficient unit widely used in the petroleum and chemical industries for separating the constituent components of a mixture of two or more materials having different boiling points. Frequently, it is used to separate hydrocarbons having different compositions. In this tower, feed is heated causing the vapors to rise and the liquid to descend. As the hot rising vapors contact the cooler descending liquid, a heat interchange takes place. The vapors are cooled and some of the higher boiler constituents condense. The heat of condensation given up to the descending liquid vaporizes some of its lower boiling constituents. Hence, there is a gradual enrichment of the lower boiling constituents in the vapors as they rise in the tower, and an enrichment of the higher boiling constituent in the liquid as it descends.

The operation of the tower depends on intimate contact of the distilling vapors and the descending liquid. To achieve this intimate contact, the tower usually includes a series of horizontal trays stacked one on top of another. These trays commonly have perforated bottoms which permit the liquid to flow downwardly as the vapors rise through liquid collected in the trays. In most commercial units, the mixture of materials is usually preheated and flows into the tower at about the tower midpoint. Heat is usually supplied by withdrawing some of the material from the tower bottom, recycling it through a heat exchanger to the tower bottom, with steam being introduced into the heat exchanger to elevate the temperature of the withdrawn and recycled material. Eventually, the lower boiling material leaves the top of the tower and flows into a heat exchanger or condenser, and is condensed and collected in a receiving drum. A portion of this condensed material is withdrawn from the drum as distillate and another portion is recycled as reflux to the top of the tower. Because cooler reflux is added to the top of the tower, more heat must be introduced into the bottom of the tower to revaporize or "reboil" the reflux. Thus, any heavy material which may reach the top of the tower as vapor is condensed and rinsed back down the tower by the reflux. Any light material which may work its way into the bottom of the tower is revaporized or reboiled by the extra heat.

Transient variations in feed rate and feed composition will cause undesirable variations in fractionation tower pressure. These variations in tower pressure will in turn cause either heavier vapor to rise in the tower or lighter liquid to "spill" down the tower detracting from the "fractionation efficiency" of the tower. This results in loss of product and damaged specifications. It can be partially corrected by additional heat and reflux, but this is costly in utilities consumption.

It is then desirable to seek a method which will accurately control pressure without excess cost in use of heat or reflux. It is most desirable to achieve a method of pressure control which allows almost no deviation even under conditions of radically changing rates of feed to the tower or under radically changing composition of that feed.

Many distillation columns encounter continuously changing feed rate and/or changing feed composition such that they remain in a constant state of upset. Such columns cannot be operated near capacity or at optimum utility consumption and seldom achieve their design fractionation efficiency. This is in large part due to the inability of the control system to anticipate changes in heat input demand either soon enough or in the proper quantity to avoid upsets resulting from the considerable time lags involved.

The prior art is filled with a variety of systems such as U.S. Pat. No. 3,411,308; U.S. Pat. No. 3,449,215; U.S. Pat. No. 3,840,437; U.S. Pat No. 3,428,528; and U.S. Pat. No. 3,415,720 which are used to control the heat input to a fractionation tower. U.S. Pat. No. 3,411,308 teaches that the flow rate of a bottoms product stream from a fractionator is regulated responsive to the difference between a delayed function of the flow rate of the feed and the sum of the flow rates of the remaining product streams. The overhead product flow rate signal is a bias value of the output of liquid level controller on the overhead accumulator instead of an actual flow measurement. The flow rate of a medium purity side draw stream is manipulated responsive to the difference between a signal representing a computed yield of the component of interest and a signal representing measured yield. U.S. Pat. No. 3,449,215 discloses that in a fractionation process in which a product flow rate is predicted from feed analysis and other factors, a signal representative of the computed product flow rate is used to control the product flow rate, and an analyzer determines the concentration of a key component in a product stream and accordingly provides a biasing signal for the computed product flow rate signal as a feedback correction thereto, an additional correction to the feedback signal is made to increase the stability of the system and to prevent conditions such as oscillation in the system which can be caused by an uncorrected feedback signal when operating or feed conditions vary. U.S. Pat. No. 3,840,437 teaches a multi-component feed stream is separated in a distillation column to provide an overhead distillate product stream and a bottoms product stream. The bottoms product stream flow rate is controlled at a level substantially equal to the computed flow rate based on a material balance determined from measurements on feed flow rate, feed composition and product specifications thereby producing a bottoms product having the desired composition. A signal representative of the predicted internal reflux flow rate is established based on measurements of feed flow rate, feed composition, feed enthalpy and product specifications. The actual internal reflux flow rate is determined and compared with the predicted internal reflux flow rate to obtain a bias signal. The bias signal is used to control the external reflux flow rate at a level such that an overhead distillate product having the desired composition is obtained. U.S. Pat. No. 3,428,528 teaches that in a fractionation system having an overhead product, a sidedraw product and a bottom product, the flow rate of each of the external reflux, the sidedraw product stream and the bottom product stream is manipulated by a respective output of a computer control system. The input of the computer control system include the feed flow rate, feed component concentrations, and desired component concentrations in each of the three product streams. The computer control system performs the simultaneous solution of three interrelated predictive equations to obtain the three flow control signals. And U.S. Pat. No. 3,415,720 relates to a method and apparatus for automatically controlling a continuous distillation process for the separation of a feed stream into a top and a bottom product stream in a column where reflux and reevaporation are applied and wherein the quality of the two product streams is controlled. However, none of these systems are able to achieve the improved results of our invention. Our invention can be differentiated from the prior art in that our invention incorporates a simple yet unique relationship which provides the correct anticipation of heat demand. This provides sustained product specification and proper and economical operating conditions even during radical changes of feed rate or feed composition. Furthermore, our invention properly controls heat input in a distillation column even during conditions of severe and extreme operating conditions, providing stability when prior control devices permit unstable operation. The results include improved product quality control, utilities saving and increased capability of the distillation column, particularly when continuously changing conditions exist.

SUMMARY OF THE INVENTION

The present invention relates to an improved apparatus and process for controlling the operation of a fractionation tower, especially for regulating heat supply and demand. More specifically, this invention relates to a feed forward control system for heat input to a fractionation tower such that a proper energy balance is maintained. Further, this invention can be combined with other fractionation tower feed forward and feedback control systems to provide complete control for tower operations.

In such a fractionation process, feed is supplied to the tower and heated, thereby causing the feed to become distilled whereupon it separates into distillate flow and bottom flow. The distillate flow, which is made up of the lower-boiling components of the feed, will rise to the top of the tower and exit through an overhead line where it is condensed. A portion of this condensed liquid is recycled back into the tower by a reflux line and this returned liquid is known as the reflux flow. The remaining portion of the liquid is drawn off as product. The bottom flow, which consists of the higher-boiling components of the feed settles to the bottom of the tower. A portion of this bottom flow is commonly recycled through a heating apparatus, i.e., reboiler, where additional heat is added, commonly by heat exchange or furnace, thereby providing a means for supplying heat to the tower. In order to obtain stable operating conditions within the tower, the signal $Q_I \alpha K_R + K_D$ is used where:

$Q_I$ is the heat required by the fractionation tower;
$K_R$ is the reflux flow rate; and
$K_D$ is the distillate flow rate.

The signal $Q_I$ represents heat demand and is based on the fundamental relationship that heat input to the tower is proportional to the amount of heat required to vaporize the reflux plus the heat required to vaporize the distillate. Naturally, the amount of heat required to vaporize the reflux or distillate is proportional to the amount of each, or to their flow rates.

$K_F$ is a scaled feed flow signal whose purpose is to correct for any vapor present in the tower feed. Vapor present in the feed contributes to the distillate recovered overhead, but does not require any heat to be distilled. A flow meter measures the amount of feed flowing into the tower. By estimating the amount of vapor in the feed, and thereby applying a scaling factor to the feed flow rate, an estimate of the amount of feed vapor, not requiring heat to vaporize, is achieved. Commonly, there is little or no vapor in the feed, and thus correction is normally not necessary. In such cases, $K_F$ would approach zero. Utilizing this signal $Q_I \alpha K_R + K_D - K_F$, it is possible to determine the amount of heat necessary to operate the tower at a constant energy balance. Correct scaling of the equation is provided by the pressure controller output. Fractionation tower operation can be best controlled if the tower operates at a relatively constant pressure. Increases or decreases in tower pressure can indicate that heat input to the tower is too high or too low, respectively. Therefore, in order to provide extremely accurate control of heat input to the tower, pressure changes should be taken into account, such as by calibrating the signal $K_R + K_D - K_F$ by the output of a fractionation tower pressure controller as below:

$$Q_I = K_p (K_R + K_D - K_F)$$

where
$Q_I$ is the heat required by the fractionation tower;
$K_p$ is the pressure controller output signal;
$K_R$ is the reflux flow;
$K_D$ is the distillate flow;
$K_F$ is a scaled feed flow signal. This equation produces the proper signal to control the heat input to the fractionation tower. Proof that this is the correct equation lies in the fact that sudden transient changes in tower conditions do not result in pressure variations within the tower.

The logic of this function can be shown since the reflux and the distillate represent the total quantity of material vaporized in the fractionation tower. These two consume most of the heat required to operate the fractionation tower. Whatever small remaining amount of heat required would manifest itself by a slowly falling tower pressure. This does not occur, of course, since the pressure controller, for example, a conventional proportional plus reset control instrument, provides the correct scaling factor, the controller output, to give an exact set point signal for heat flow.

Having been properly scaled, the control equation now correctly anticipates changing heat demand as reflux rate and distillate rate may fluctuate or be separately controlled. The resulting signal $Q_I$ controls heat flow to the heat input means in the proper amount, obviating any transient fluctuations in tower pressure which might otherwise result from the changing tower conditions.

The term "fractionation tower" as used throughout this application includes both fractionation towers and distillation columns. Some of the more commonly used columns include: debutanizer distillation columns, deisobutanizer distillation columns, depropanizer distillation columns, and the like. However, it is possible to employ our new control process on any towers or columns built to perform similar operations.

THE DRAWING

FIG. 1 is a schematic drawing of a fractionation tower equipped with a control unit of our invention.

As shown in FIG. 1, our control scheme is used to control the operation of a fractionation tower 12 employing a flooded condenser drum 14. The tower 12 is shown with feed being introduced through a feed line 16 to about the midpoint of the tower 12. Liquid 18 at the bottom of the tower 12 circulates through a heat exchanger 20, and steam or other heating medium introduced into the heat exchanger through a valved heat line 22, heats the liquid. The feed is thus distilled with the light ends being removed as vapor or overhead from the top of the tower 12 via a vapor line 24. These vapors flow through a condenser 26 and condense to flood the condenser drum 14. Distillate flows from the bottom of this drum 14 and is split into two streams. One stream is recycled as reflux to the top of the tower through a valved reflux line 28. The other stream is withdrawn through a valve distillate line 30. The liquid 18 comprises the heavy ends or bottoms of the feed which are withdrawn from the tower 12 via valved bottoms line 32. Valves 33, 34, 35 and 36, respectively, in lines 28, 30, 22, and 32 are provided with respective transducers 37, 38, 39 and 40 which open and close the valves in accordance with an electrical control signal received by the transducers.

Control unit 10 is a flow controller. Flow controller 10 through valve transducer 39 regulates the flow rate of steam through heat exchanger 20. A pressure transmitter 44 in the overhead line 24 monitors tower pressure and provides a signal directly proportional to this pressure to pressure controller 2. A suitable pressure controller is described in detail in U.S. Pat. No. 3,905,873 which is hereby incorporated by reference. Reflux flow transmitter 48 in the reflux line 28 monitors reflux flow rate and provides a current signal directly proportional to the square of reflux flow rate. Distillate flow transmitter 50 in the distillate line 30 monitors distillate flow rate and provides a current signal directly proportional to the square of the distillate flow rate. Heat flow transmitter 52 in the steam line 22 monitors the flow of heat, such as the flow rate of steam in the reboiler, into the tower and provides a current signal directly proportional to the square of the heat flow rate which provides the measurement to flow controller 10. Feed flow transmitter 56 in the feed line 16 monitors the flow rate of feed into the tower. An estimate of the amount of vapor in the feed is made and is used to scale the feed flow rate signal of transmitter 56 so that a signal proportional to the amount of vapor in the feed is achieved.

Often little or no vapor is present in the feed and the signal is insignificant or zero. Bottoms flow transmitter 58 in the bottoms line 32 monitors the flow rate of bottoms and provides a signal directly proportional to the square of this flow rate.

Heat input to the tower is controlled by a signal corresponding to the reflux flow rate; the distillate flow rate; minus the scaled feed flow rate. Signals from flow transmitters 56, 48 and 50 go to square root extractors 3, 4 and 5, respectively, and then to summer 6. Summer 6 adds signals from square root extractors 3 and 4, and subtracts the signal from square root extractor 5. The output from summer 6 establishes the proportional relationship between heat supply and demand. In order to provide the necessary accuracy to anticipate heat demand, a signal from pressure controller 2 is used in multiplier 7 to calibrate the output from summer 6. The output from multiplier 7 sets flow controller 10 which controls steam flow rate to heat exchanger 20 thus controlling energy balance within the system.

We claim:

1. A method for controlling a fractionation tower and process wherein feed and heat flow into the tower and feed is distilled and separated into distillate and bottoms, said distillate flowing from the tower through an overhead line to a condenser where it is condensed before it is drawn off as product with a portion of this product being returned to the tower as reflux, and said bottoms being allowed to at least partially collect in the tower thereby establishing a liquid level which is allowed to fluctuate within predetermined limits, which method comprises: monitoring the pressure within said tower; providing a signal thereof and transmitting said signal to a pressure controller; utilizing said pressure controller to generate a scaled ouput signal which increases when the measured pressure decreases and vice versa; simultaneously generating and using a composite signal:

$$Q_I = K_p(K_R + K_D - K_F)$$

where $Q_I$ is the heat required by the fractionation tower;
$K_p$ is the pressure controller output signal;
$K_R$ is the reflux flow rate signal;
$K_D$ is the distillate flow rate signal;
$K_F$ is a scaled feed flow rate signal; and; transmitting said composite signal to a second controller which controls heat input to provide an energy balanced and stable fractionation tower and process even during periods of severe and extreme operating conditions by controlling amount of reflux and heat into said tower and amount of distillate and bottom exiting said tower.

2. The method of claim 1 wherein the signal $Q_I$ and second flow controller are used to control heat input at a reboiler.

3. An apparatus for controlling a fractionation tower and process where feed and heat flow into the tower and feed is distilled and separated into distillate and bottoms, said distillate flowing from the tower through an overhead line into a condenser where it is condensed before it is drawn off as product with a portion of this product being returned to the tower as reflux, and said bottoms being allowed to at least partially collect in the tower thereby establishing a liquid level which is allowed to fluctuate within predetermined limits, which apparatus comprises: means for monitoring the pressure within said tower and for transmitting a signal thereof to a pressure controller; said pressure controller being capable of generating a scaled output signal which increases when the pressure signal decreases and vice versa; means for generating a composite signal:

$$Q_I = K_p(K_R + K_D - K_F)$$

where $Q_I$ is the heat required by the fractionation tower;
$K_p$ is the pressure controller output signal;
$K_R$ is the reflux flow;
$K_D$ is the distillate flow;
$K_F$ is a scaled feed flow signal; and means for transmitting said composite signal to a second controller which controls heat input into said tower so that said composite signal can be used to provide an energy balanced and stable fractionation tower and process by controlling amount of reflux and heat into said tower and amount of distillate and bottom exiting said tower.

4. The apparatus of claim 3 wherein a pressure transmitter situated in the overhead line of the fractionation tower monitors tower pressure provides a signal directly proportional to this pressure to the pressure controller.

5. An apparatus for controlling the heat input to a fractionation tower comprising:

flow meter for measuring the reflux rate $K_R$;
flow meter for measuring the distillate flow rate $K_D$;
means for measuring the scaled feed flow rate $K_F$;
means for measuring the pressure in said tower and transmitting a signal thereof to a pressure controller for generating a scaled signal $K_p$ which increases when the pressure signal decreases and vice versa; means for generating a composite signal corresponding to $K_p(K_R + K_D - K_F)$; and a second controller responsive to said composite signal for controlling heat input so that said composite signal can be used to provide an energy balanced and stable fractionation tower by controlling amount of reflux and heat into said tower and amount of distillate and bottom exiting said tower.

* * * * *